United States Patent [19]

Matsuda

[11] Patent Number: 5,978,102
[45] Date of Patent: Nov. 2, 1999

[54] IMAGE READING APPARATUS

[75] Inventor: Shinya Matsuda, Kyoto, Japan

[73] Assignee: Minolta Co., Ltd., Osaka, Japan

[21] Appl. No.: 08/754,830

[22] Filed: Nov. 22, 1996

[30] Foreign Application Priority Data

Nov. 24, 1995 [JP] Japan ................................ 7-329667

[51] Int. Cl.⁶ ............................ H04N 1/04; G03B 27/58
[52] U.S. Cl. ........................ 358/474; 358/486; 358/488; 358/493; 358/497; 355/47
[58] Field of Search ..................... 358/474, 475, 358/471, 497, 494, 464, 488, 486, 487, 493; 355/25, 18, 58, 55, 47; 399/361, 362; 382/255, 114; 348/351, 357, 63, 62, 142

[56] References Cited

U.S. PATENT DOCUMENTS

| | | | |
|---|---|---|---|
| 5,084,611 | 1/1992 | Okisu et al. | 250/208.1 |
| 5,416,609 | 5/1995 | Matsuda et al. | 358/474 |
| 5,608,537 | 3/1997 | Manabe et al. | 358/401 |
| 5,764,379 | 6/1998 | Matsuda et al. | 358/474 |
| 5,838,374 | 11/1998 | Kikuchi | 348/351 |

*Primary Examiner*—Edward L. Coles
*Assistant Examiner*—Mark Wallerson
*Attorney, Agent, or Firm*—McDermott, Will & Emery

[57] ABSTRACT

An image reading apparatus for reading open-faced documents comprises a document table for placing documents, an image sensing device for reading a document placed on said document table, a height detector for detecting height of said document at different positions in the main scan direction, and a displacement mechanism for displacing said image sensing device to accomplish focusing within a plane perpendicular to the subscan direction.

7 Claims, 11 Drawing Sheets

IMAGE READING APPARATUS

BACKGROUND OF THE INVENTION

1. Field of the Invention

The present invention relates to an image reading apparatus that senses from above the open-faced surfaces of a document such as a book or the like, and more specifically relates to an image reading apparatus which accomplishes focusing and corrects image distortion by detecting the distance to a document surface.

2. Description of the Related Art

Conventional image reading apparatuses that sense from above the open-faced surfaces of a document disposed face upward are known which sense, in addition to sensing the surface of the document, the image of the side surface of a document, e.g., the image of the interior side surface of the document, and recognize the shape of the document side surface by detecting the difference in the luminance of said side surface and the luminance of the background so as to detect the height of the document from the detected shape of said side surface, and thereby accomplish focusing in accordance with the height of the document as well as correct image distortion caused by changes in the height of the document.

Figure 17A:
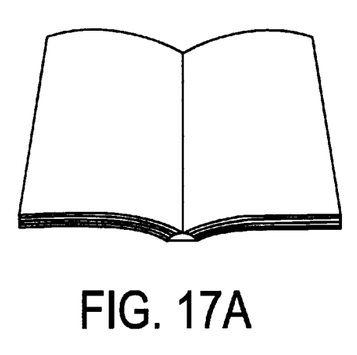
FIGS. 17a and 17b show the situations when a document has a peaked shape and an inverted peaked shape, respectively.
Figure 17B:
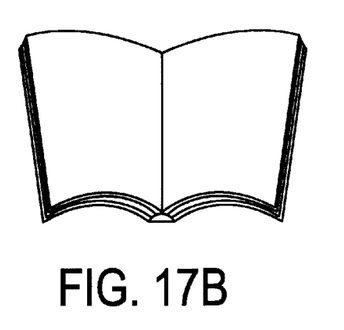
Figure 17C:
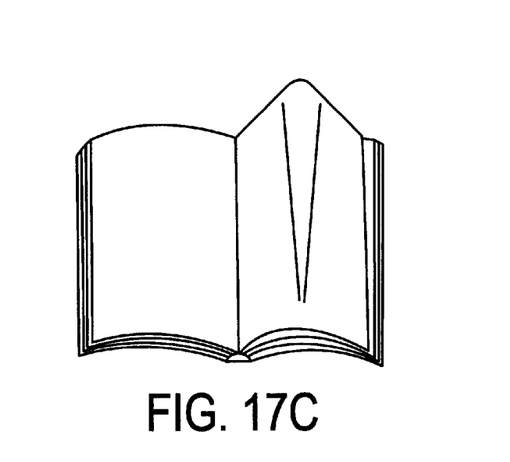
FIG. 17c shows the situation when the document page is distorted.
Figure 17D:
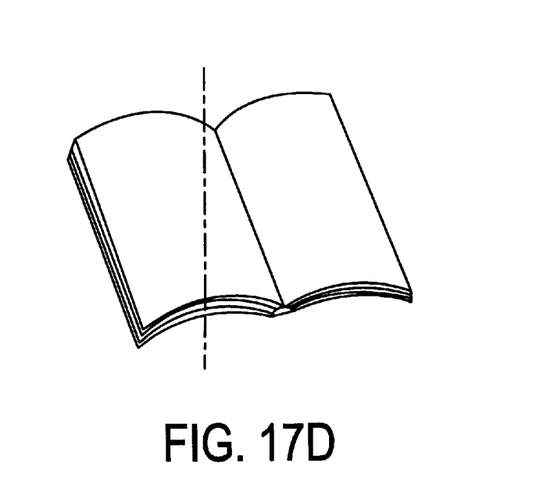
FIG. 17d shows the situation when a document is placed at an inclination.

Therefore, the height detection methods of the aforesaid conventional apparatuses are disadvantageous in that when there is a difference in the heights of the interior side and the front side of a document, focusing and image distortion correction are inadequate because the height of the front side of the document cannot be accurately measured since the shape of the document side surface is recognized by sensing the side surface of the interior side of the document. Examples of such situations include, as shown in FIGS. 17a and 17b, situations when a document is placed so as to form a peaked shape without the interior side of the document being adequately open and when a document is placed so as to form an inverted peaked shape without the front side of the document being adequately open, situations when page distortion is caused by the poor condition of the document as shown in FIG. 17c, and situations when a document is placed so as to be inclined as shown in FIG. 17d.

SUMMARY OF THE INVENTION

A main object of the present invention is to eliminate the previously mentioned disadvantages by providing an image reading apparatus capable of accurately measuring variations in the height of a document surface in documents which have different heights at the interior side and the front side of the document.

Another object of the present invention is to provide an image reading apparatus capable of accurate focusing in accordance with a document having different heights at the interior side and the front side of said document.

A further object of the present invention is to provide an image reading apparatus capable of producing suitably corrected images from a document having different heights at the interior side and the front side of said document.

The present invention achieves these objects by providing an image reading apparatus for reading open-faced documents, said image reading apparatus comprising a document table for placing documents, image sensing device for reading a document placed on said document table, height detecting means for detecting height of said document at different positions in the main scan direction, and displacement means for displacing said image sensing device to accomplish focusing within a plane perpendicular to the subscan direction.

In the image reading apparatus of the aforesaid construction, the image sensing device reads the document placed on the document table, the height detecting means detects the height of the document in the subscan direction at different positions in the main scan direction, and the displacement means displaces the image sensing device within a plane perpendicular to the subscan direction to accomplish focusing. Thus, even when the height of the document is different at the front side and the interior side, i.e., even when the document height read by the image sensing device is different in the main scan direction, the height of the document can be accurately detected and appropriate imaging can be accomplished.

The present invention is an image reading apparatus for reading open-faced documents, said image reading apparatus comprising a document table for placing documents, image sensing device disposed opposite said document table and provided with a line sensor and drive source for moving said line sensor in the subscan direction, illumination device for illuminating the document table with linear light extending in the subscan direction, and height detecting means for detecting document height based on the reading data of the image sensing means which reads the linear light reflected by a document illuminated by said illumination device.

The present invention is an image reading method for reading open-faced documents, said method comprising steps of illuminating a document with a plurality of linear light extending in the subscan direction, reading a plurality of linear light reflected by a document via an image sensing device, determining the position of linear light from read data and calculating document height from the position of said linear light.

These and other objects, advantages and features of the present invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

FIG. 17 shows the disposition of a placed document.

DETAILED DESCRIPTION OF THE PREFERRED EMBODIMENTS

The preferred embodiments of the present invention are described hereinafter with reference to the accompanying drawings.

Figure 1:
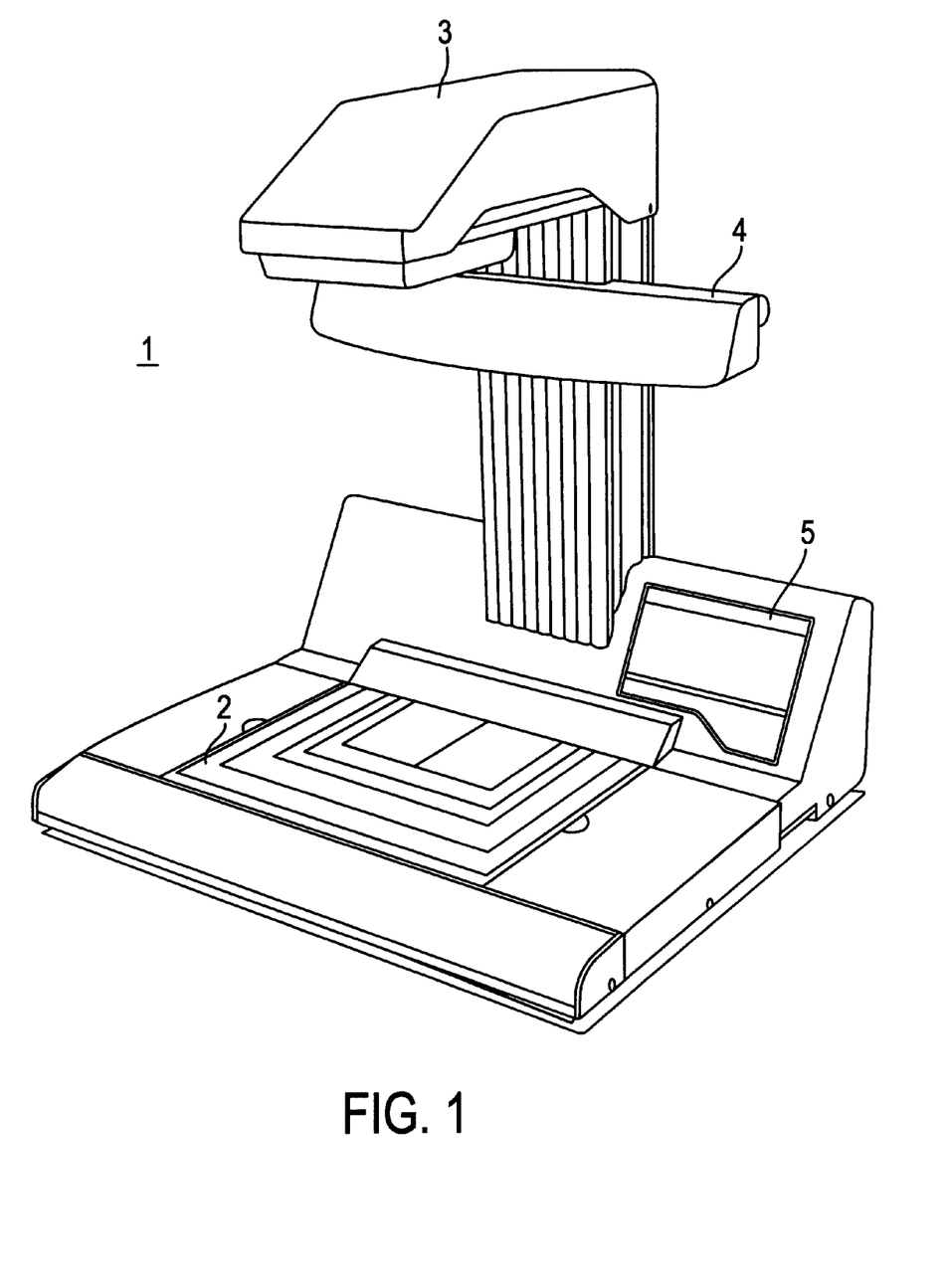
FIG. 1 is an exterior view showing the construction of an embodiment of the image reading apparatus of the present invention.

FIG. 1 is an exterior view showing the construction of an image reading apparatus. Image reading apparatus 1 is provided with a document table 2 upon which a document such as a book or file is placed in a face upward condition, and above said document table 2 is disposed an image sensing camera unit 3 which scans and reads a document placed on document table 2. Between document table 2 and image sensing camera unit 3 is a work space of a predetermined spacing. Image sensing device 1 is provided with an illumination unit 4 arranged at the interior side above document table 2 for illuminating a document placed thereon, operation unit 5 for setting various image reading conditions, projection device 11 for projecting a plurality of linear lights onto said document to measure document height at different positions in the main scan direction sensed by a charge-coupled device (CCD) sensor described later (refer to FIG. 3), and a control unit not shown in the drawing.

Figure 2:
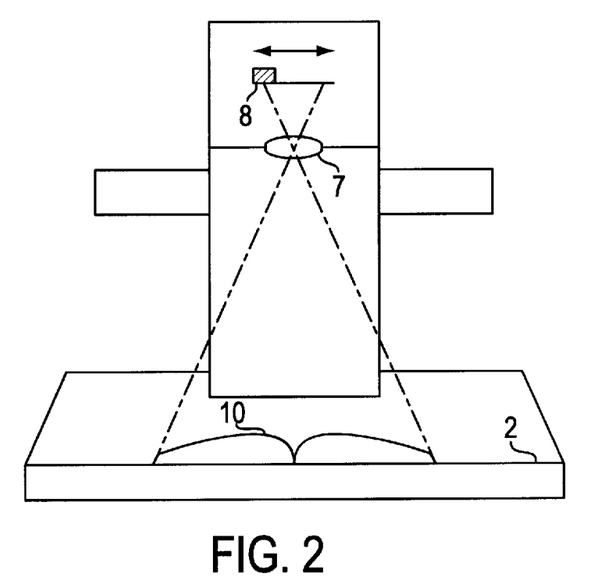
FIG. 2 briefly shows the construction of the image reading apparatus of FIG. 1 viewed from the front.
Figure 3:
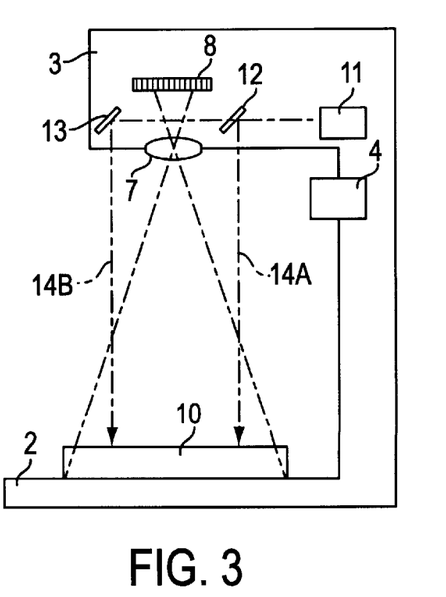
FIG. 3 briefly shows the construction of the image reading apparatus of FIG. 1 viewed from the side.

FIGS. 2 and 3 briefly show the construction if image reading apparatus 1 viewed from the front and side, respectively. Image sensing camera unit 3 comprises an imaging lens 7 for forming an image of a document on image sensing elements, and CCD line sensor 8 (i.e., image sensor) for scanning in the subscan direction (direction indicated by the arrow in FIG. 2) on the focal surface on which is formed the image of a document. In this apparatus, the main scan direction is a vertical direction of a document placed on the document table, and the subscan direction is the lateral direction of said document. A document 10 placed on document table 2 is, for example, a book or file or the like wherein one side of the open-faced bound pages forms a spatially curved cylindrical shape.

Projection device 11 is constructed so as to project linear light generated by said projection unit onto the interior side and the front side (i.e., top side and bottom side) of a document surface via half mirror 12 and mirror 13. The height distribution from document table 2 to the document surface can be measured by detecting the amount of displacement of the projection device (described in detail later).

Figure 4:
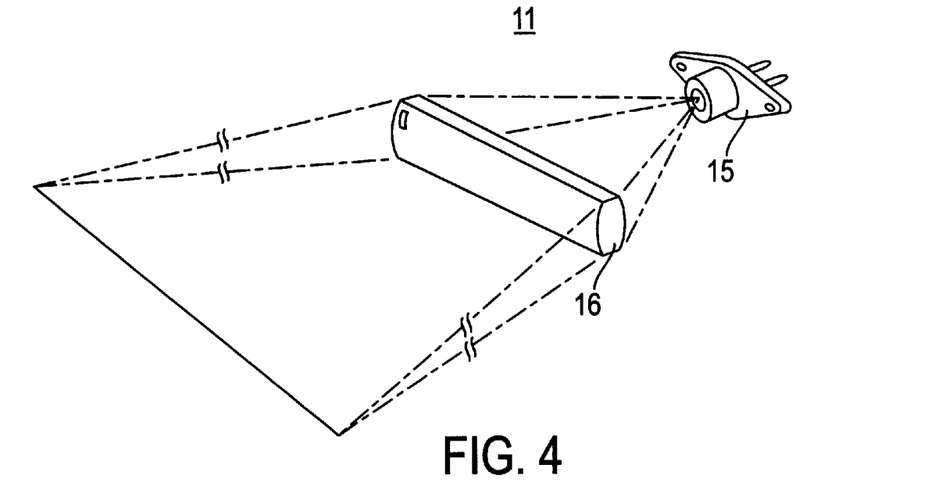
FIG. 4 shows the projection optical path of the projection device used by the apparatus of FIG. 1 viewed from the side.

As shown in FIG. 3, linear light 14 emitted from projection device 11 is split into two rays of reflected light and transmitted light by half mirror 12, then the transmitted light is reflected by mirror 13. Each of the reflected rays are respectively projected as top linear light 14A and bottom linear light 14B to the interior side and front side of the document surface. The lines projected onto the document surface by linear light 14A and 14B are read by image sensor 8 in a prescan so as to determine document height data in a manner described later. FIG. 4 briefly shows the construction of the projection unit of projection device 11. The projection unit comprises a semiconductor laser 15 as a light emitting element, and a cylindrical lens 16 as a condensing device for condensing the emitted light into linear form. Linear light rays having minimal width variation can be produced via the aforesaid construction.

Figure 5A:
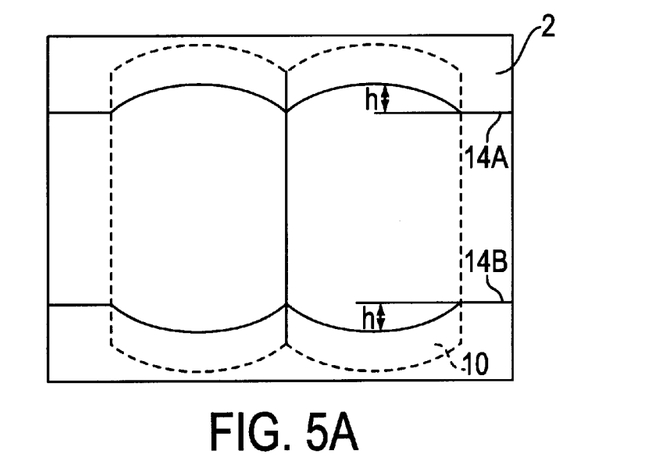
FIG. 5a shows an image of the document table surface upon which is placed an open-faced book document.
Figure 5B:
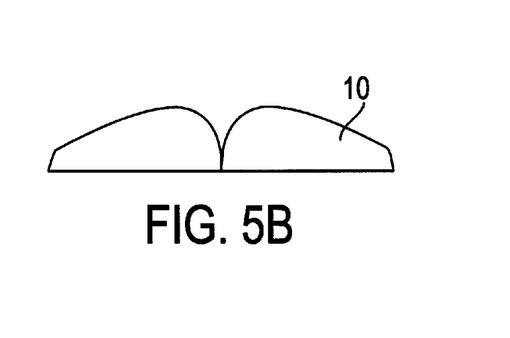
FIG. 5b is a side view of a book document.

FIG. 5a shows an image when the surface of document table 2 is read by image sensor 8 when the previously described linear light 14A and 14B are projected onto the surface of document table 2 with an open-faced book document 10 placed thereon, and FIG. 5b shows a side view of a book document. Since image sensor 8 is positioned intermediately to the interior side and the front side of document 10, image sensor 8 can read either of the projected linear light 14A or 14B from an inclined overhead position. The open-faced surfaces of book document 10 have an undulating shape as shown in FIG. 5b, such that linear light 14A and 14B projected on the interior side and front side on the surface of document 10 are read vertically via the light projected on document table 2. In the drawing, the distances h between the position of linear light 14A and 14B on document table 2 in the main scan direction and the position of linear light 14A and 14B on document 10 correspond to the document height from document table 2 to the document surface. When the illumination light is turned OFF, the parts of the document 10 on which are projected the linear light 14A and 14B are bright, and the other parts of the surface of document 10 and document table 2 are relatively darker.

Figure 6:
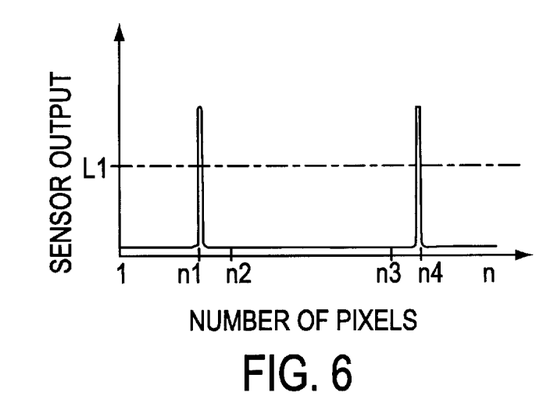
FIG. 6 shows an example of 1-line output read in the main scan direction by the image sensor of the present embodiment.

FIG. 6 shows an example of 1-line output in the main scan direction read by image sensor 8; the data is for positions in the subscan direction of the image of FIG. 5a. the number of pixels of image sensor 8 are shown on the horizontal axis (left: interior side of the document; right: front side), and the sensor output is shown on the vertical axis. Reference symbol L1 refers to the illumination threshold value for discriminating the linear light 14A and 14B projected on document 10, reference symbol n1 refers to a minimum value of pixels appearing in sensor output exceeding the threshold value L1 in the projection of top linear light 14A. When the document table height is zero, reference symbols n2 and n3 refer to the pixels (fixed values) corresponding to the positions of linear light projected in the main scan direction, and reference symbol n4 the maximum value of the pixels appearing in the sensor output exceeding the threshold value L1 above n3 of projected bottom linear light 14B. the values (n2−n1) and (n4−n3) are the number of pixels, corresponding to the amount of displacement of said linear light 14A and 14B, and further correspond to the previously mentioned distance h. The values of n1 and n4 change in accordance with the lateral movement of image sensor 8 (i.e., movement in the subscan direction), such that the displacement distribution of linear light 14A and 14B in the lateral direction of the document can be obtained.

Figure 7:
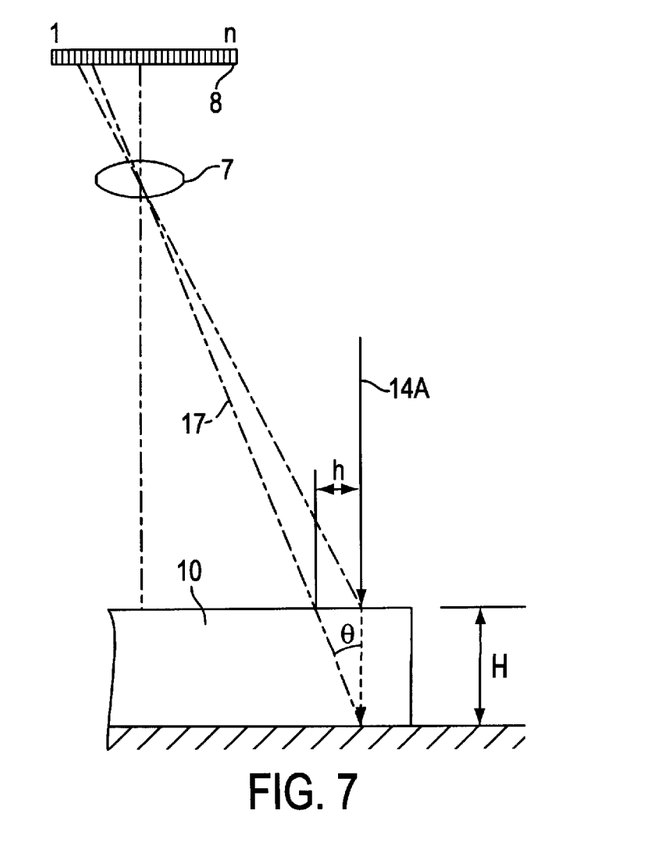
FIG. 7 shows the optical path of the image sensing system of the present embodiment viewed from the side.

FIG. 7 shows the optical path of the image sensing system viewed from the side.

If the light reflected toward image sensor 8 from the position of the intersection of linear light 14A and the surface of document table 2 is designated image light 17 and the angle formed by image light 17 and linear light 14A on the document table is designated angle θ, when the surface of a document having a height H is read, the amount of displacement h of linear light 14A on the document surface is expressed by Equation 1 below. Specifically, the distribution (number of pixels) of the determined amount of displacement is converted to a distribution (length) of the amount of displacement on the document surface using the image sensing magnification and reading resolution, and the distribution of document height data is obtained by substitution in the equation below.

$$h = H \times \tan\theta \qquad \text{Eq. 1}$$

Figure 8:
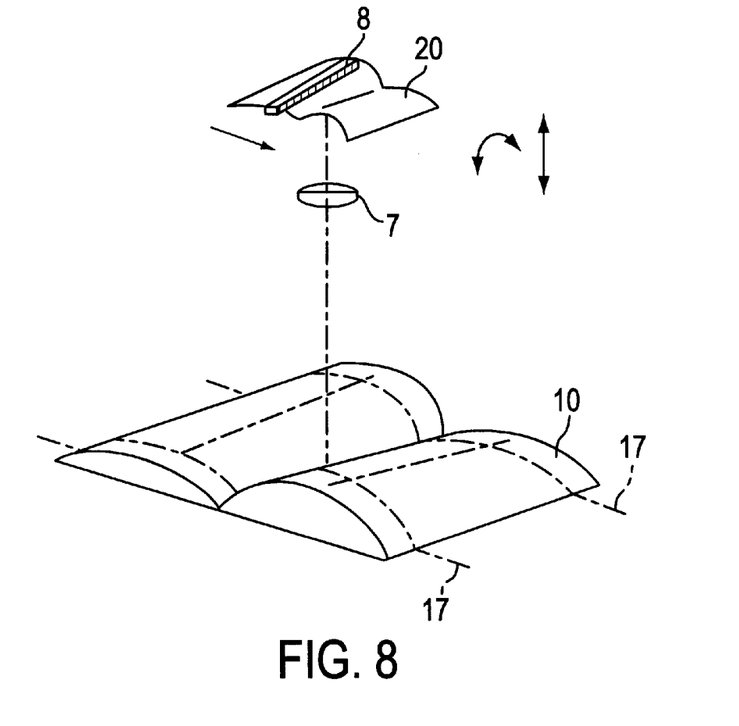
FIG. 8 illustrates the positional relationship of the imaged document and the image sensor scanning said document in the present embodiment.

FIG. 8 shows the positional relations between the sensed document and the image sensor 8 that scans said document. Image sensor 8 moves in the subscan direction via a vertical movement and a rotational movement as indicated by the arrows in accordance with the measured change in height of the document surface as previously described. The movement of image sensor 8 is expressed by reference number 20.

Figure 9:
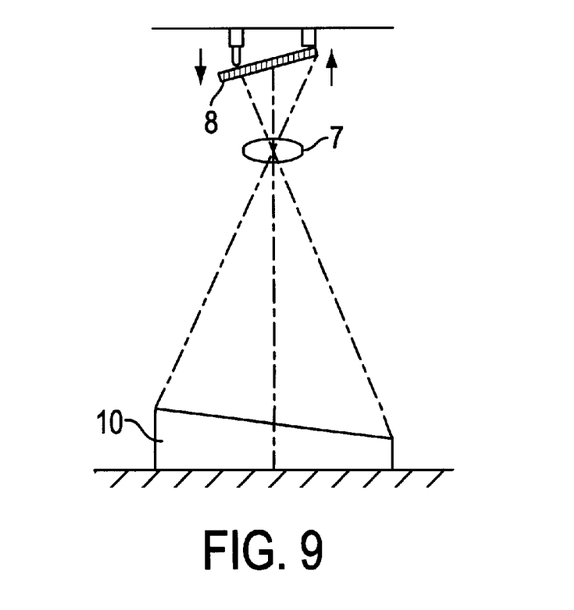
FIG. 9 shows the condition of FIG. 8 when viewed from the side.
Figure 10:
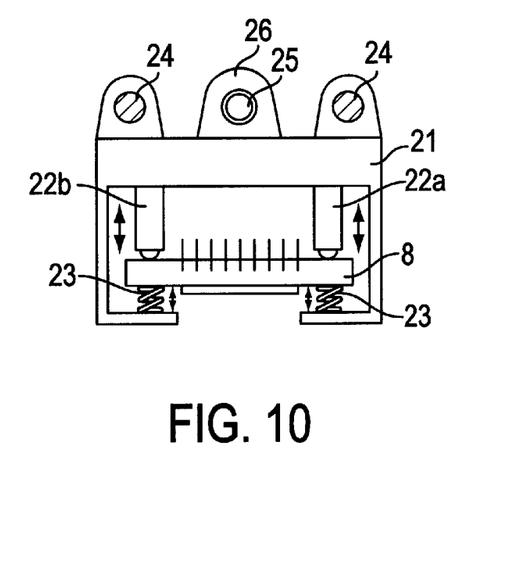
FIG. 10 illustrates the essential portion of the image sensor displacement mechanism of the present embodiment.

FIG. 9 shows the situation of FIG. 8 viewed from the side. Image sensor 8 is adjusted to a low position at the area where the document is highest, and adjusted to a high position at the area where the document is lowest. This positional relationship is determined by the well known geometric optical Equation 2 below.

$$1/f = 1/a + 1/b \qquad \text{Eq. 2}$$

Where the following definitions obtain.
f: lens focal length
a: distance from lens to image surface
b: distance from object to lens FIG. 10 briefly shows the displacement mechanism of image sensor 8.

Image sensor 8 is provided so as to be movable within frame 21. Piezoelectric elements 22a and 22b are drive sources fixedly attached to frame 21 as a references and engage the bilateral ends of image sensor 8, and springs 23 are mounted as pressure members joining said elements and frame 21. The position/angle of image sensor 8 can be changed to conform to the document height by applying electric fields to piezoelectric elements 22a and 22b which correspond to the interior side and front side of the document based on the (n2−n1) and (n4−n3) data which correspond to the document heights shown in FIG. 6 so as to expand or contract piezoelectric elements 22a and 22b. Piezoelectric elements 22a and 22b comprise the displacement means for displacing image sensor 8 to accomplish focusing within a plane perpendicular to the subscan direction. Frame 21 is supported by slide guide 24 so as to be movable in the subscan direction via the connection of feed screw 25 and nut 26.

Figure 11:
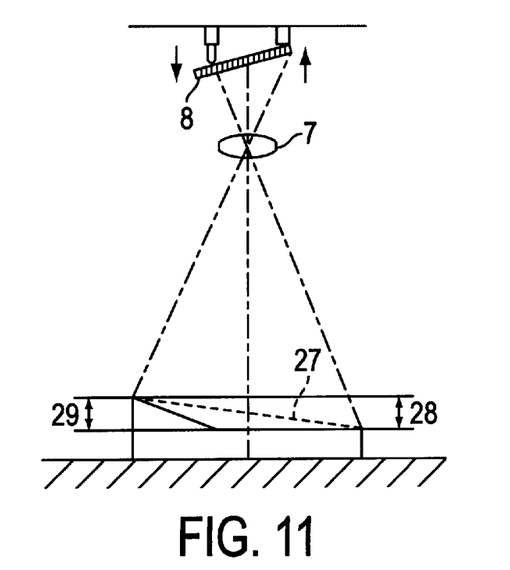
FIG. 11 shows the situation when there is variable height of a document in the main scan direction.

FIG. 11 shows the situation when the pages of a document are curved, such that the height of the document changes in the main scan direction. In the drawing, the position indicated by the dashed line is the focus plane. Although distance 28 (corresponding defocus) is produced between the document surface and the focal plane in the present example, this value normally becomes a smaller value than distance 29 when height is measured on one side of a document as is done conventionally, and it can therefore be understood that precision is improved compared to conventional methods.

Figure 12:
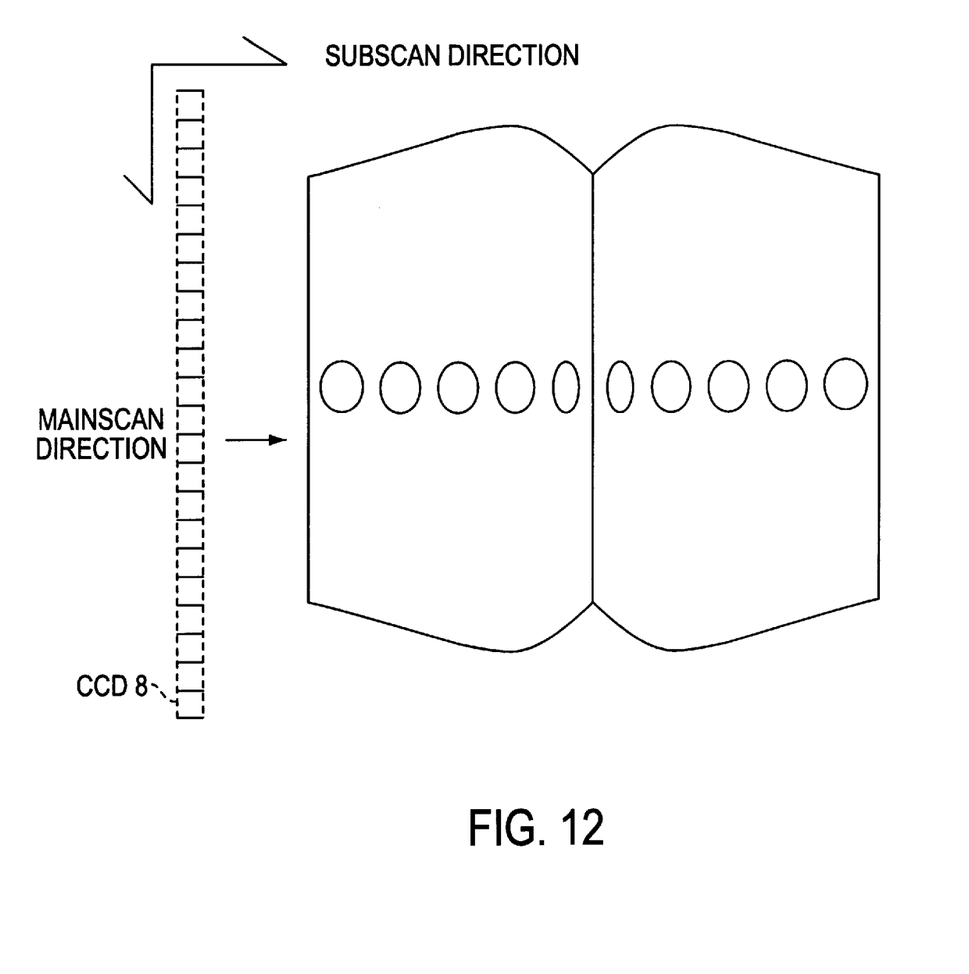
FIG. 12 is a conceptual drawing showing correction of image distortion.

The image distortion correction process is described below. FIG. 12 is a conceptual illustration showing the correction of image distortion. When an upright document is read from overhead, image distortion is generated vertically and laterally. This distortion is similar to the human feeling of perspective in that an object becomes larger as it approaches the image sensor 8 (i.e., as the document becomes higher), whereas an object becomes smaller as it becomes farther away (i.e., as the document becomes lower). Thus, in the region of the document binding the pages are inclined, and said inclination causes a compression of the document image in the lateral direction in the drawing. In the present embodiment, an image processing circuit (reference number 37 in FIG. 13) capable of optionally changing the image sensing magnification bidirectionally in the main scan and subscan direction to accomplish processing of the read image signals, and image distortion is corrected by continuously adjusting the magnifications in both directions using the document heights determined in the manner previously described.

Figure 13:
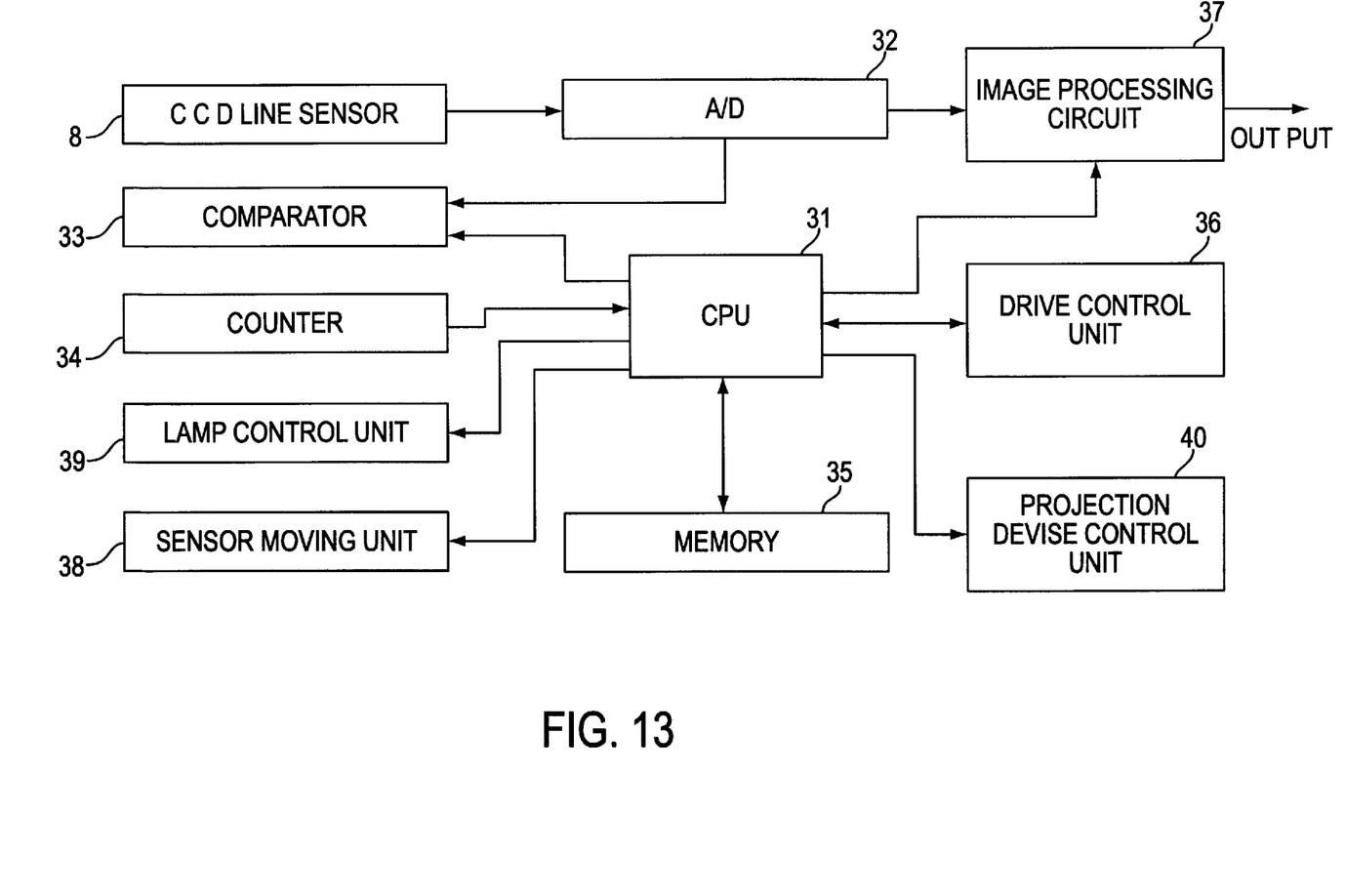
FIG. 13 is a block diagram of the control circuit.

FIG. 13 is a block diagram of the control circuit used by the present invention. This control circuit is provided with a central processing unit (CPU) 31 to control the entire image reading apparatus in predetermined sequences. Sensor moving unit 38 is a control unit for driving piezoelectric elements 22a and 22b, and drive control unit 36 is a control unit for moving sensor 8 in the subscan direction by driving a motor connected to feed screw 25. The output of CCD line sensor 8 is subjected to digital conversion via an analog-to-digital (A/D) converter 32, and thereafter input to a comparator 33. The illumination threshold value L1 (refer to FIG. 6) is set beforehand in comparator 33 via CPU 31. When data are input which exceed the threshold value L1 set in comparator 33, the counter 34 is set. CPU 31 stores the maximum value n1 and the minimum value n4 of the count value of counter 34 in memory 35. The document heights (n2−n1) and (n4−n3) are determined by the aforesaid stored data and fixed values n2 and n3, and the height distribution is determined from said data in the subscan direction. CPU 31 calculates the amount of movement of CCD line sensor 8 based on the determined document height distribution, and said sensor 8 is moved in the subscan direction by controlling the actuation of the previously mentioned drive control unit 36 and sensor moving unit 38 based on said calculation, whereby sensor 8 is moved vertically to accomplish focusing. CPU 31 calculates the amount of image distortion based on the determined document height distribution, and corrects said distortion by controlling the image processing circuit 37. Furthermore, CPU 31 controls projection device control unit 40 which controls the linear light emitted form projection device 11, and controls lamp control unit 39 which controls the lamp light of illumination unit 4.

Figure 14:
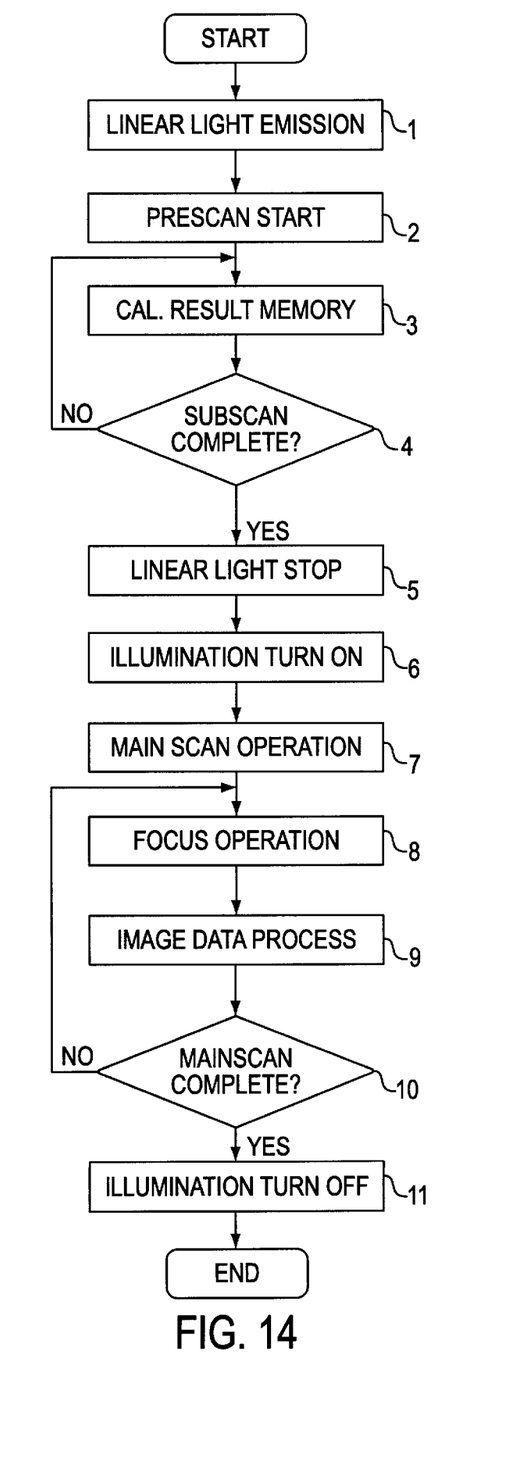
FIG. 14 is a flow chart of the reading operation of the present embodiment.

FIG. 14 is a flow chart of the reading operation. When a reading operation start command is input, CPU 31 controls projection device control unit 40 and linear light is emitted by projection device 11 (#1). Then, the prescan operation starts (#2), and the document shape detection operation is executed. In this operation, the data of one line in the main scan direction are read by CCD line sensor 8, the height of the document is detected at two locations, and said values are stored in memory 35. After the sensor 8 has moved in the subscan direction a predetermined distance only, the data of one line in the main scan direction are read, and the height of the document is determined at said two new locations. The document height distribution in the lateral direction of the document can be determined by repeating this operation each time the line sensor advances a predetermined distance until the line sensor reaches the trailing edge in the subscan direction. CPU 31 calculates the amount of image distortion and amount of movement of line sensor 8 in a vertical direction based on the document height distribution stored in memory, and said values are then stored in memory 35 (#3).

When the prescan is completed (#4: YES), linear light projection stops (#5), the lamp of illumination unit 3 is turned ON via lamp control unit 39, and document 10 is illuminated (#6). Thereafter, CCD line sensor 8 scans in the opposite direction to the prescan, and the main scan is executed to read the document (#7). In the main scan, the sensor moving unit 38 and image processing circuit 37 are controlled as the document is read so as to accomplish focusing (#8), and the image distortion correction process is executed (#9). When the main scan operation is completed (#10: YES), the lamp is turned OFF (#11), and the image reading operation ends.

Figure 15:
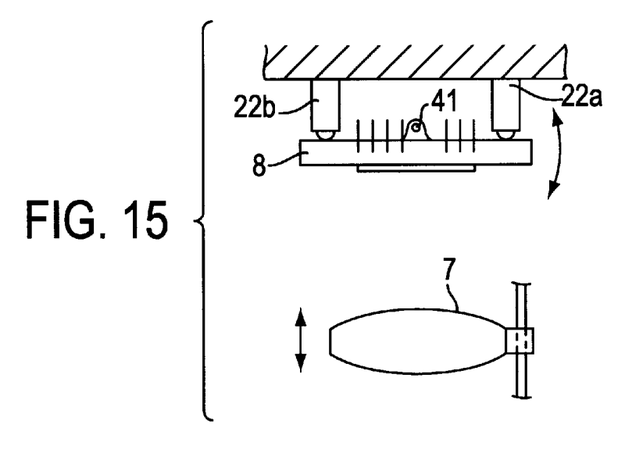
FIG. 15 shows another example of a construction for accomplishing focusing.

The present invention is not limited to the previously described embodiment and may be variously modified. For example, although the displacement means used for focusing in the aforesaid embodiment accomplishes focusing by moving/rotating image sensor 8 using piezoelectric elements 22, the displacement means is not limited to the use of piezoelectric elements 22 inasmuch as it is possible to adjust the length of the optical path using a wedge shaped prism filled with liquid by changing the thickness of the prism, as disclosed in Japanese Unexamined Patent Application No. HEI 6-175014. Furthermore, it is possible to rotate image sensor 8 about a pivot 41 using piezoelectric elements 22a and 22b rather than moving said image sensor 8 and move lens 7, as shown in FIG. 15.

Figure 16:
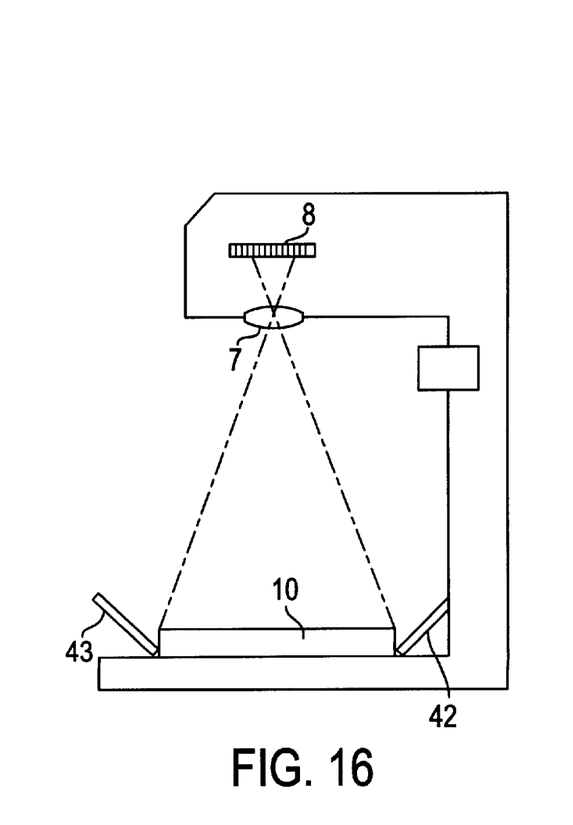
FIG. 16 shows another example of a construction for accomplishing height measurement of a document.

Although the height of the document was measured at the front side and the interior side using linear light in the aforesaid embodiment to detect the height of the document, it is possible, for example to provide mirrors 42 and 43 at the interior side and the front side of the document table to project the side surfaces of the document to image sensor 8, as shown in FIG. 16, such that the images of both the front and interior side surfaces projected by said mirrors 42 and 43 can be sensed by image sensor 8, and both document heights can be measured via said images.

According to the image reading apparatus of the previously described embodiment, document height data are detected at a plurality of different positions in the main scan direction, and the image sensing device is displaced within a plane perpendicular to the subscan direction in accordance with said obtained plurality of height data to accomplish focusing, such that variations in the height of a document can be accurately measured even when has different heights in the main scan direction, e.g., when a document having a peaked shape or inverted peaked shape is placed on the document table, when pages are distorted to the poor condition of a document, when a document is placed at an inclination and the like, thereby allowing accurate focusing to obtain excellent images. Furthermore, imprecise focusing can be restricted to a minimum limit even when the pages of a document are curved so as to have a variable height.

Although the present invention has been fully described by way of examples with reference to the accompanying drawings, it is to be understood that various changes and modifications will be apparent to those skilled in the art. therefore, unless otherwise such changes and modifications depart from the scope of the resent invention, they should be construed as being included therein.

What is claimed is:

1. An image reading apparatus for reading open-faced documents, said image reading apparatus comprising:
   a document table for placing documents;
   image sensing device for reading a document placed on said document table;
   height detecting means for detecting height of said document at different positions in a main scan direction; and
   displacement means for angularly displacing said image sensing device within a plane normal to a subscan direction to accomplish focusing that accommodates for differing heights of the document at different positions along the main scan direction.

2. An image reading apparatus as claimed in claim 1, wherein said displacement means also moves said image sensing device in a vertical direction to accomplish focusing that accommodates for differing heights of the document at different positions along the subscan direction.

3. An image reading apparatus as claimed in claim 1, wherein said height detecting means detects height of the document based on the reading data of the image sensing device.

4. An image reading apparatus for reading open-faced documents, said image reading apparatus comprising:
   a document table for placing documents;
   image sensing device disposed opposite said document table and provided with a line sensor and drive source for moving said line sensor through a plurality of subscan positions in a subscan direction;
   illumination device for illuminating the document table with linear light extending in the subscan direction;
   height detecting means for detecting document height data at a plurality of main-scan positions within each subscan position of the line sensor, based on the reading data of the image sensing means which reads the linear light reflected by a document illuminated by said illumination device; and
   displacement means for angularly displacing said line sensor within a plane normal to the subscan direction, in accordance with the document height data, to accomplish focusing that accommodates for differing heights of the document at different positions along the main scan direction.

5. An image reading apparatus as claimed in claim 4, wherein said illumination device illuminates the document table with a plurality of linear light extending in the subscan direction, and said height detecting means detects document height of plural position on the document based on the reading data of the image sensing means.

6. An image reading method for reading open-faced documents comprising;
   a first step of illuminating a document with linear light extending in a subscan direction, at a plurality of positions within a main-scan direction;
   a second step of reading reflected linear light reflected by said document via an image sensing device;
   a third step of determining the positions of said linear light from data read by said image sensing device;
   a fourth step of calculating document height data at said plurality of positions within said main-scan direction from the positions of said linear light; and
   a fifth step of angularly displacing the image sensing device within a plane normal to the subscan direction, in accordance with the document height data, to accomplish focusing that accommodates for differing heights of the document at different positions along the main scan direction.

7. An image reading method as claimed in claim 6, wherein said fourth step calculates document height based on the distance between the position of said linear light and a predetermined position.

* * * * *